Dec. 14, 1948.    W. H. HARSTICK    2,456,276
STALL COCK FOR MILKING MACHINES
Filed June 20, 1947
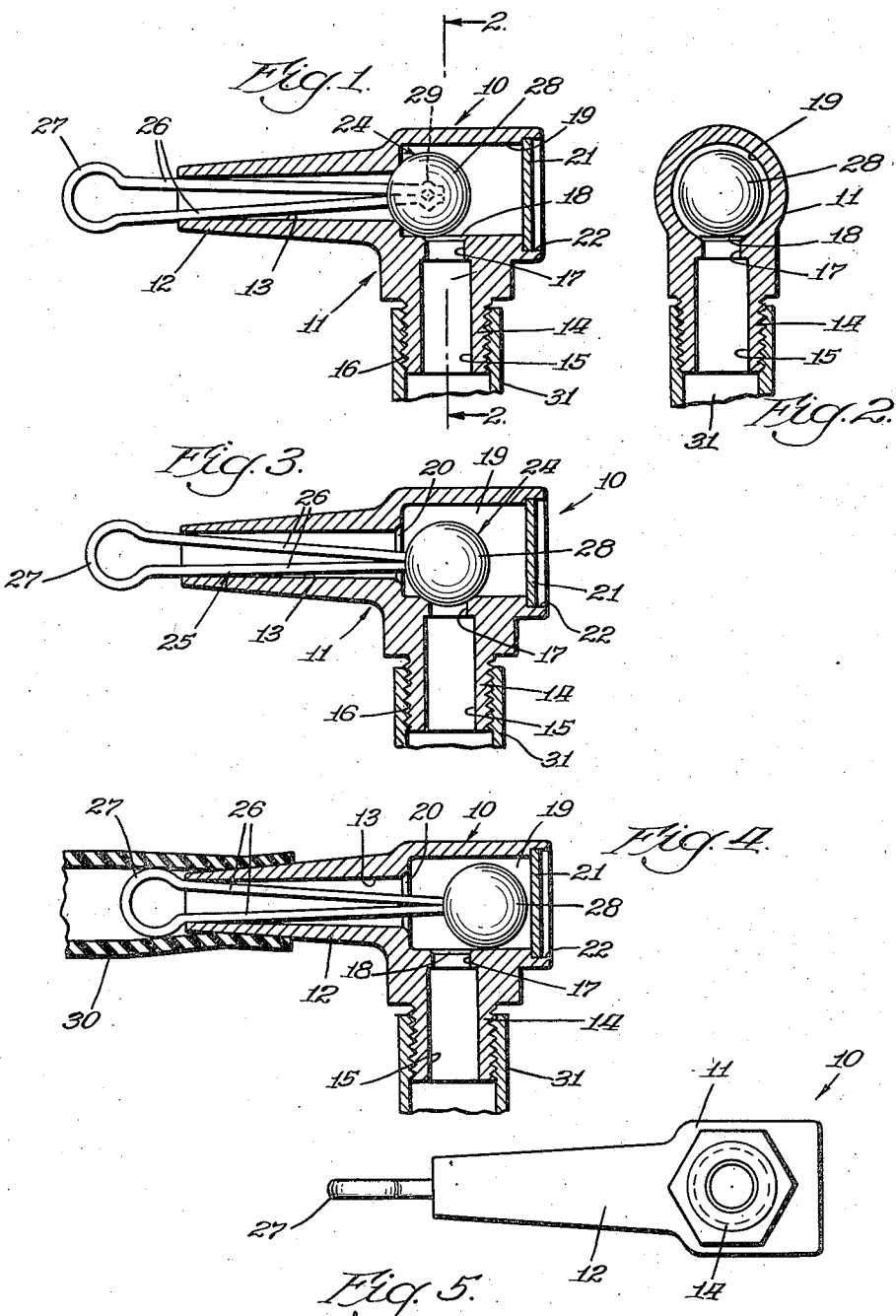
INVENTOR.
William H. Harstick
BY Paul O. Pippel
Atty.

Patented Dec. 14, 1948

2,456,276

UNITED STATES PATENT OFFICE 2,456,276

STALL COCK FOR MILKING MACHINES

William H. Harstick, Oak Park, Ill., assignor to International Harvester Company, a corporation of New Jersey Application June 20, 1947, Serial No. 755,992

9 Claims. (Cl. 284—4)

1

This invention relates to a coupling device. More specifically, it relates to a stall cock used in conjunction with milking machine installations.

Stall cocks of the type with which this invention is concerned are generally connected to a vacuum line positioned adjacent the milking stalls of a dairy barn. A stall cock is connected to this line at each stall. As the operator moves a milking machine from one stall to another, he couples the flexible stanchion hose of his milking machine to the coupling connection of the stall cock. A vacuum pump is generally provided at the end of the vacuum line to provide a source of vacuum or air pressure. In order to secure a maximum time saving and efficiency in connecting the stanchion hose to the stall cock, it is desirable to provide a stall cock which automatically opens when the stanchion hose is engaged with the device and also automatically closes immediately after the stanchion hose is removed.

During the normal milking operation the stall cock is connected to the line in which a vacuum is created by means of a vacuum pump. Under some circumstances, however, it is desirable to reverse the flow of air within the pipe line and force air under pressure through the individual stall cocks. This may be the situation when it is necessary to attach an insecticide sprayer to the stall cock for the purpose of spraying and cleaning the individual cow stalls. For this and other reasons it is thus desired to have so-called "positive pressure" rather than "vacuum" within the pipe lines. In situations of this type it is also desirable that the stall cock be constructed to automatically shut off the flow of air therethrough upon disconnection of the stanchion hose which is attached to the stall cock.

The prime object of this invention, therefore, is to provide a two-way stall cock having automatic valve means for shutting off the flow of fluid therethrough regardless of the direction of flow.

Another object is to provide a simple and efficient stall cock which may be manufactured at low cost and is unlikely to break down during use.

Still another object is to provide a coupling device having a two-way check valve therein, said check valve being movable from a sealing position during the connection of said coupling device to a fluid transmission line.

A still further object is to provide an improved stall cock for milking machine installations, said stall cock comprising a valve chamber having connecting members in communication with the chamber, and a ball valve adapted to seal either of said connecting members from the chamber and being displaceable from said sealing relation during the operative connection of one of said connecting members to a fluid transmission line.

The construction of this stall cock and its mode of operation will be more clearly understood by referring to the annexed drawing which illustrates a preferred embodiment of the invention.

In the drawings:

Figure 1 is a cross sectional view in elevation of a stall cock showing an automatic valve in one sealing position.

Figure 2 is a sectional view taken along the line 2—2 of Figure 1.

Figure 3 is a view similar to Figure 1 showing the automatic valve in a second sealing position.

Figure 4 is a cross sectional view of a stall cock showing its connection to a pipe line and a flexible fluid transmission line.

Figure 5 is a bottom view of the stall cock.

A coupling device or stall cock is generally indicated by the reference character 10. The stall cock 10 includes a body 11 generally shaped in the form of a T. The body 11 is provided with a hollow connecting member, or conduit, 12 provided with a bore 13 extending through said member. A connecting member or conduit 14 of relatively shorter length is disposed at substantially a right angle with respect to the connecting member 12, and includes a bore 15. The connecting member 14 is provided at its end with a threaded extension 16. The bore 15 is in communication with a substantially narrower bore 17 which terminates at its innermost end in a beveled valve seat 18. The bores 15 and 17 are in communication with a valve chamber 19 formed in the body 11. The innermost end of the bore 13 is also provided with a beveled valve seat 20, which with said bore, is in communication with the chamber 19. A plug member 21 is wedged in an undercut recess 22 formed at one end of the body 19, said plug 21 serving as a closure member for the chamber 19.

An automatic two-way valve member is generally designated by the reference character 24. The valve member includes a valve stem 25 having a pair of diverging legs 26 which extend within the bore 13 of the connecting member 12. The diverging legs 26, as best shown in Figures 1 and 3, project outwardly of the connecting member 12 and are provided at their outermost ends with an engaging member or loop portion 27. The engaging member or loop portion 27 is of relatively larger cross section dimension than the outermost end of the connecting member 12.

The inner ends of the diverging legs 26 are securely embedded within a ball valve 28. The ball valve 28 is free to float within the chamber 19 and is generally constructed of a resilient sealing material such as rubber or any flexible resilient material. The ends of the diverging legs 26 are suitably dimpled, as shown in the dotted lines of Figure 1, to additionally secure the stem within the ball valve. As best shown in Figure 4, the connecting member 12 is secured in telescoping relation with a flexible fluid transmission line or stanchion hose 30. The stanchion hose 30 is generally connected to a milking machine (not shown). The connecting member 14 is in turn coupled to the vacuum line 31 which is in communication with a source of vacuum or vacuum pump (not shown).

In the disclosure shown in Figure 1, the ball valve 28 is seated upon beveled valve seat 20 and thereby closes off the bore 13 from communication with the chamber 19. In this position the vacuum pump is not used to draw a vacuum but instead is utilized to pump air into the bore 15 and chamber 19, whereby the pressure differential between the bores 13 and 15 causes the valve member 28 to seat upon the valve seat 20 and thereby seal one end of the bore 13. When the valve is in this position, the operator may desire to utilize air pressure for spraying a barn and the animals with an insecticide, etc.

In the disclosure of the stall cock shown in Figure 3, the ball valve 28 is seated upon the valve seat 18 for closing the bore 15 from communication with the chamber 19. In the position shown here, the vacuum pump is regulated to pump air from the bore 15, thereby creating a vacuum within the chamber 19. The pressure differential between the bore 15 and bore 13 causes the ball valve 28 to seat upon the valve seat 18 and seal the bore 15 from communication with the chamber 19. In this position, the operator is ready to connect the stanchion hose of his milking machine.

Referring particularly to Figure 4, this disclosure shows the movement of the valve 28 when a fluid transmission line or stanchion hose is coupled to the connecting member 12. The operator merely places the flexible hose 30 over the connecting member 12. As he performs this operation, the engaging member or loop 27 frictionally engages the inner walls of the stanchion hose, and as a result of this frictional engagement, the ball valve 28 is moved from either of the valve seats 18 or 20 to the position shown in Figure 4. In this position, therefore, the valve 28 is not in sealing engagement with either one of the valve seats and therefore fluid may flow in either direction through the stall cock depending upon whether it is desired to utilize vacuum or positive air pressure. When the operator has finished this operation, he simply pulls the hose 30 from coupling connection with the connecting member 12. Depending on the direction of flow of fluid through the stall cock, the valve member takes either the position shown in Figures 1 or 3. In either position, automatic sealing of the stall cock is effected and the operator need not engage in any manual action to shut off the flow of fluid through said coupling device.

It can readily be seen that the objects of the invention have been achieved, and that a positive, simple, and inexpensive stall cock has been provided. It is to be understood that modifications will be made which do not depart from the spirit of the invention as disclosed nor the scope thereof as defined in the appended claims.

What is claimed is:

1. A coupling device comprising a body having a chamber, first and second connecting members having bores in communication with said chamber, a valve seat at the inner end of each bore, a valve member within said chamber, said valve member being positioned to engage either one of said valve seats in sealing relation, a valve stem connected to said valve, said stem extending within one of said connecting members and projecting therefrom, an engaging member connected to said valve stem, said engaging member being relatively larger than the outer end of said connecting member and adapted to frictionally engage a fluid transmission line coupled over said conduit, whereby said valve member is displaced from one of said valve seats.

2. A coupling device comprising a body having a chamber, connecting members having first and second conduits in communication with said chamber, a valve member within said body, said valve member being movable to seal said first conduit during the flow of fluid in one direction, and operable to seal said second conduit during the flow of fluid in a second direction, said fluid flow occurring during a pressure differential between said first and second conduits, and means connected to said valve member and engageable with a fluid transmission line for displacing said valve member from sealing relation with said conduits during connection of said fluid transmission line with one of said connecting members.

3. A coupling device comprising a body having a chamber, connecting members having first and second conduits in communication with said chamber, a two-way check valve within said chamber, said check valve being operable to seal either one of said conduits from said chamber during a fluid pressure differential within one conduit with respect to the other, and engaging means connected to said valve and operable to frictionally engage a fluid line coupled to one of said connecting member whereby said check valve is moved out of sealing relation with respect to either conduit.

4. A coupling device comprising a body having a chamber, connecting members having a pair of conduits in communication with said chamber, valve seats at the inner ends of said conduits, a two-way valve within said chamber, said valve being operable with said valve seats to seal either of said conduits during a fluid pressure differential therein, a stem connected to said valve member, said stem extending within one of said conduits, engaging means on said stem frictionally engageable with a fluid transmission line connected to one of said connecting members whereby said valve member is displaced from sealing engagement with either of said valve seats.

5. A coupling device comprising a body having a chamber, connecting members having a pair of conduits in communication with said chamber, valve seats at the inner end of said conduits, a valve within said chamber operable to seal either one of said conduits during a fluid pressure differential therein, a stem connected to said valve member, said stem extending through one of said conduits and projecting outwardly therefrom, and an engaging member connected to said stem and operable to frictionally engage a fluid line coupled to said connecting member, whereby said valve is moved out of sealing position with relation to either of said conduits.

6. A stall cock for a milking machine installation comprising a body having a chamber, connecting conduits having bores in communication with said chamber, a valve seat at the inner end of each bore, a valve member within the chamber including a ball valve adapted to engage any one of said valve seats in sealing relation, a valve stem connected to said ball valve, said valve stem having diverging leg members extending outwardly within the bore of one of said conduits and projecting therefrom, an engaging member connected to the outer end of said diverging legs, said engaging member being relatively larger than the outer end of said conduit and adapted to frictionally engage a hose coupled over said conduit, whereby said ball valve is displaced from sealing engagement with any one of said valve seats.

7. A stall cock for a milking machine system comprising a body having a chamber, connecting members having conduits in communication with the chamber, a valve member within the chamber movable to seal any one of said conduits, a valve stem connected to said valve member, said valve stem extending outwardly through one of said conduits, and an engaging means connected to said valve stem, said engaging means being operable to engage portions of a fluid line coupled to one of said connecting members whereby said valve member is moved and retained from sealing relation with any of said conduits.

8. A stall cock for a milking machine system comprising a body having a chamber, conduits in communication with the chamber, a ball valve within said chamber movable to seal any one of said conduits, a valve stem connected at its inner end to said ball valve, said valve stem extending within one conduit and projecting outwardly therefrom, and an engaging member connected to the projecting end of said valve stem, said engaging member being relatively larger in cross section than said conduit, whereby said engaging member frictionally engages portions of a fluid line being coupled to said conduit thereby moving said ball valve from sealing relation with respect to any one of said conduits.

9. A stall cock for a milking machine system comprising a body having a chamber, a pair of connecting members having conduits in communication with said chamber, valve seats at the inner ends of said conduits, said valve seats being positioned angularly with respect to one another, a ball valve within said chamber movable to engage said valve seats in sealing relation, a valve stem connected to said ball valve and extending outwardly within one conduit and projecting therefrom, and an engaging member connected to the projecting end of said valve stem, said engaging member being operable to engage portions of a flexible fluid line normally coupled over one of said connecting members, whereby said ball valve is moved and retained from sealing relation with either one of said valve seats during the coupling relation of said fluid line and said connecting members.

WILLIAM H. HARSTICK.

No references cited.